(12) United States Patent
Mochizuki et al.

(10) Patent No.: US 9,358,918 B2
(45) Date of Patent: Jun. 7, 2016

(54) VEHICLE HEADLAMP

(71) Applicant: KOITO MANUFACTURING CO., LTD., Tokyo (JP)

(72) Inventors: Kiyotaka Mochizuki, Shizuoka (JP); Naohisa Tatara, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 163 days.

(21) Appl. No.: 13/949,646

(22) Filed: Jul. 24, 2013

(65) Prior Publication Data

US 2014/0029289 A1    Jan. 30, 2014

(30) Foreign Application Priority Data

Jul. 25, 2012  (JP) .................. 2012-164732

(51) Int. Cl.
*B60Q 1/08*      (2006.01)
*B60Q 1/14*      (2006.01)
(Continued)

(52) U.S. Cl.
CPC  *B60Q 1/06* (2013.01); *B60Q 1/143* (2013.01); *F21S 48/1154* (2013.01); *F21S 48/1186* (2013.01); *F21S 48/1747* (2013.01); *F21S 48/1794* (2013.01); *B60Q 1/1423* (2013.01); *B60Q 2300/056* (2013.01); *B60Q 2300/322* (2013.01); *B60Q 2300/41* (2013.01); *B60Q 2300/42* (2013.01); *B60Q 2300/45* (2013.01)

(58) Field of Classification Search
CPC ............ B60Q 1/06; B60Q 1/14; B60Q 1/143; B60Q 1/1407; B60Q 1/1415; B60Q 1/1423; B60Q 2300/056; B60Q 2300/322; B60Q 2300/41; B60Q 2300/42; B60Q 2300/43; B60Q 2300/45; F21S 48/1154; F21S 48/1159; F21S 48/1186; F21S 48/1747; F21S 48/1794; F21S 48/11; F21S 48/1145; F21S 48/1768; F21S 48/1773; F21S 48/1778; F21S 48/1784; F21S 48/1789; F21S 48/1705; F21S 48/171

See application file for complete search history.

(56) References Cited

U.S. PATENT DOCUMENTS 6,293,686 B1 *  9/2001  Hayami ................. B60Q 1/085
                                                            307/10.8
7,036,966 B2 *  5/2006  Strazzanti ..................... 362/510
7,204,627 B2 *  4/2007  Ishida ................. F21S 48/1154
                                                            257/E33.059

(Continued)

FOREIGN PATENT DOCUMENTS

CN    101162080 A    4/2008
CN    101934757 A    1/2011

(Continued)

OTHER PUBLICATIONS

Office Action issued in corresponding Chinese Application No. 201310303064.4, mailed on May 15, 2015 (15 pages).

(Continued)

*Primary Examiner* — Alan Cariaso
(74) *Attorney, Agent, or Firm* — Osha Liang LLP

(57) ABSTRACT

A vehicle headlamp includes a first lamp unit having a first irradiation range, the first lamp unit being configured such that the first irradiation range is adjustable in a horizontal direction, and a second lamp unit having a second irradiation range, the second lamp unit being configured such that the second irradiation range is adjustable in a vertical direction. A resolution of the second lamp unit with respect to the second irradiation range is higher than a resolution of the first lamp unit with respect to the first irradiation range.

16 Claims, 12 Drawing Sheets

(51) Int. Cl.
  *B60Q 1/06* (2006.01)
  *F21S 8/10* (2006.01)

(56) References Cited

U.S. PATENT DOCUMENTS

| | | | |
|---|---|---|---|
| 7,500,773 B2 * | 3/2009 | Komatsu | F21S 48/1159 |
| | | | 362/539 |
| 2004/0105264 A1 * | 6/2004 | Spero | 362/276 |
| 2007/0058387 A1 | 3/2007 | Takada | |
| 2007/0103923 A1 | 5/2007 | Fukawa et al. | |
| 2014/0185307 A1 * | 7/2014 | Lee et al. | 362/465 |

FOREIGN PATENT DOCUMENTS

| | | | | |
|---|---|---|---|---|
| JP | 2000-238576 A | 9/2000 | | |
| JP | 2006-221882 A | 8/2006 | | |
| JP | 2009179121 A | 8/2009 | | |
| JP | 2011-063070 A | 3/2011 | | |
| JP | EP 2295291 A1 * | 3/2011 | | B60Q 1/143 |

OTHER PUBLICATIONS

Notification of Reasons for Refusal issued in corresponding Japanese Application No. 2012-164732, mailed on Mar. 29, 2016 (8 pages).

* cited by examiner

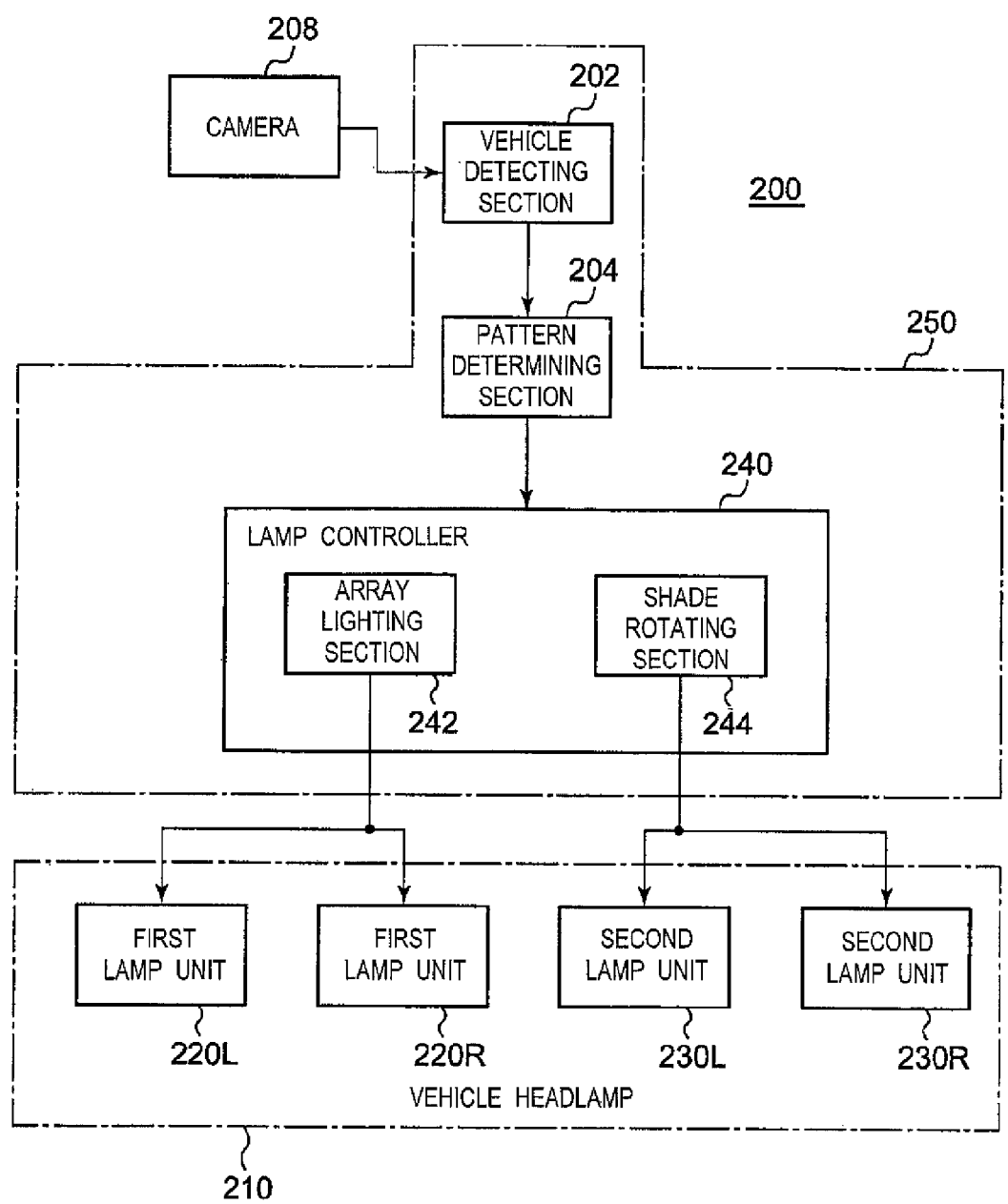

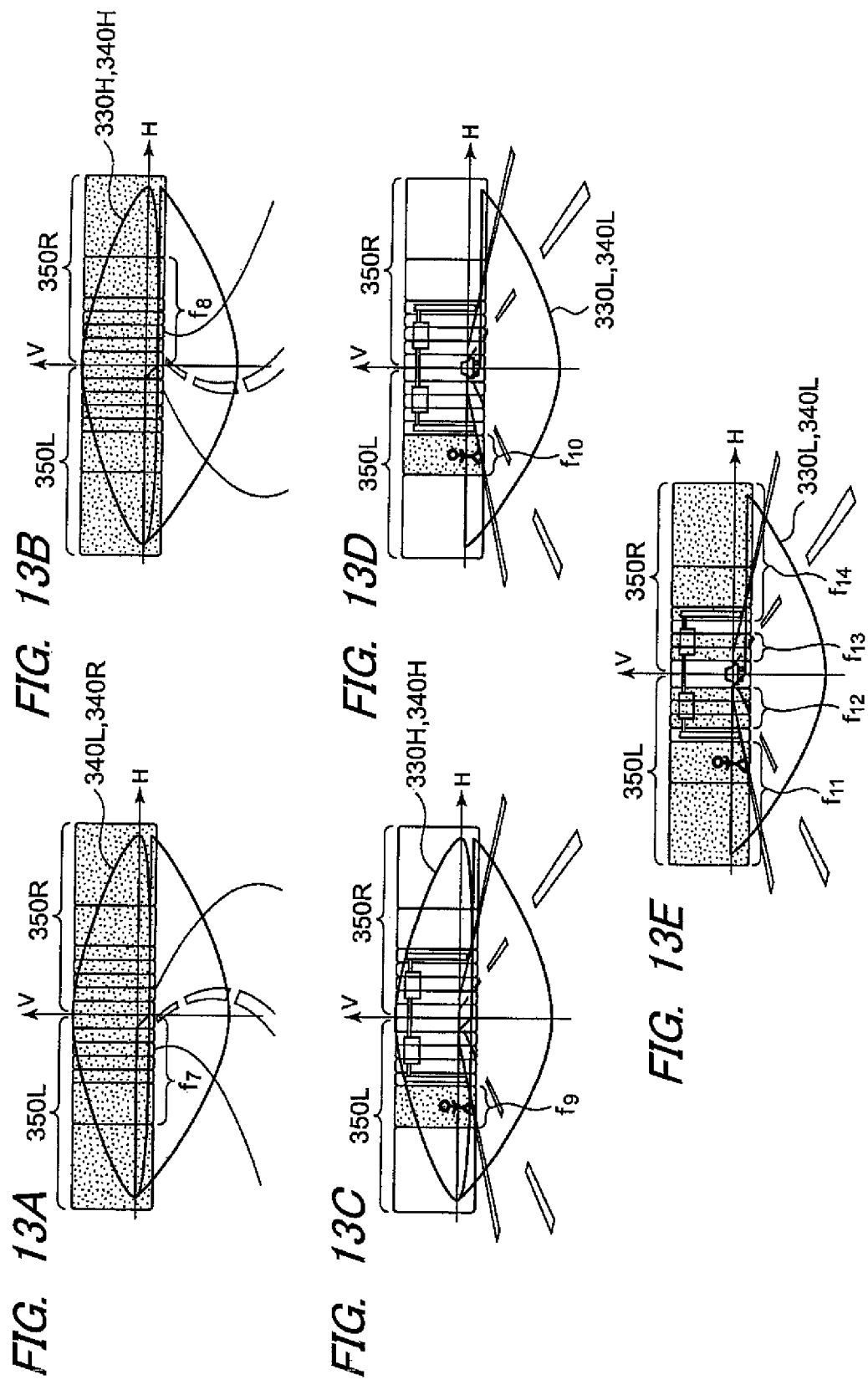

VEHICLE HEADLAMP

CROSS-REFERENCE TO RELATED APPLICATIONS

The present application claims priority from Japanese Patent Application No. 2012-164732 filed on Jul. 25, 2012, the entire content of which is incorporated herein by reference.

BACKGROUND OF INVENTION

1. Field of the Invention

The present invention relates to a vehicle headlamp configured to change a light distribution pattern in accordance with a driving environment.

2. Related Art

A related art vehicle headlamp includes a light emitting device array having a plurality of semiconductor light emitting devices configured to irradiate a plurality of individual irradiation regions into which a region above the horizontal line is divided along the horizontal direction. With such vehicle headlamps, an adaptive driving beam (ADB) can be achieved by controlling the light emitting device array such that one or more individual irradiation regions corresponding to a position at which a forward vehicle or a pedestrian is detected is not irradiated, so as to avoid giving a glare to a driver of the forward vehicle or the pedestrian. In addition to dividing the region above the horizontal line along the horizontal direction, the light emitting device array may be configured such that the region is also divided along the vertical direction into plural stages so as irradiate individual irradiation regions arranged in a lattice structure, thereby being able to form a light distribution pattern having a vertical cutoff line (see, e.g., see JP2009-179121A).

However, when implementing the ADB by using of the individual irradiation regions arranged in a lattice structure, a width of the light distribution in the vertical direction is changed only by the height of the individual irradiation region. Therefore, a gap may be formed between the horizontal cutoff line of the light distribution pattern and the forward vehicle, in which case sufficient irradiation may not be provided in the vicinity of the horizontal cutoff line, which is important in view of ensuring distant visibility.

SUMMARY OF INVENTION

One or more embodiments of the present invention provides a vehicle headlamp capable of sufficiently irradiating the vicinity of a horizontal cutoff line when irradiation ranges formed by two lamp units are combined to form various light distribution patterns.

According to one or more embodiments of the present invention, a vehicle headlamp includes a first lamp unit having a first irradiation range, the first lamp unit being configured such that the first irradiation range is adjustable in a horizontal direction, and a second lamp unit having a second irradiation range, the second lamp unit being configured such that the second irradiation range is adjustable in a vertical direction. A resolution of the second lamp unit with respect to the second irradiation range is higher than a resolution of the first lamp unit with respect to the first irradiation range.

Because the resolution of the irradiation range of the second lamp unit which can change the irradiation range in the vertical direction is higher than that of the first lamp unit, the vicinity of the horizontal cutoff line can be irradiated in a suitable manner in any light distribution pattern.

The term "resolution" used herein means "fineness with which the area of the irradiation range on the virtual vertical screen is increased/decreased (changed) when changing the irradiation range" in the respective lamp units.

Other aspects and advantages of the invention will be apparent from the following description, the drawings and the claims

BRIEF DESCRIPTION OF DRAWINGS

FIG. 12 is a block diagram of a vehicle headlamp system including the vehicle headlamp and a control unit for determining a light distribution pattern to be formed by the vehicle headlamp; and FIGS. 13A to 13E are diagrams illustrating examples of a combined light distribution pattern fainted by a combination of a first lamp unit and a second lamp unit.

DETAILED DESCRIPTION

Hereinafter, embodiments of the present invention will be described with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
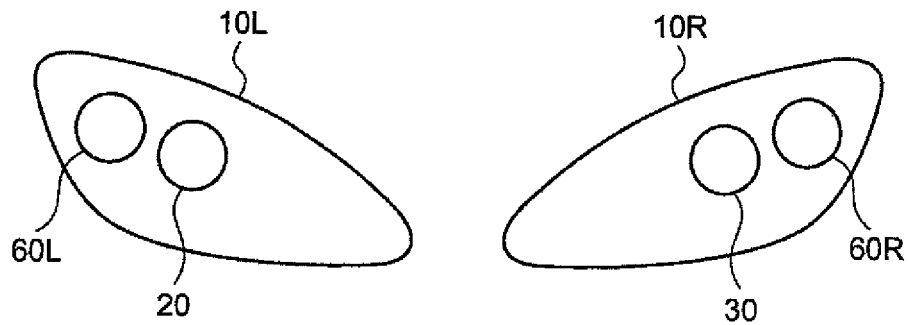
FIG. 1 is a front view of a vehicle headlamp according to one or more embodiments of the present invention.

FIG. 1 is a front view of a vehicle headlamp 10 according to one or more embodiments of the present invention. The vehicle headlamp 10 includes a left lamp 10L and a right lamp 10R which are disposed at a front portion of a vehicle body. The left lamp 10L has a lamp unit 20 (a first lamp unit) of an LED array type and a high-low switchable lamp unit 60L. The right lamp 10R has a lamp unit 30 (a second lamp unit) of a mechanical switching type configured to mechanically switch a horizontal cutoff line, and a high-low switchable lamp unit 60R. In the illustrated embodiment, the left lamp 10L and the right lamp 10R are provided with the different types of lamp units.

Figure 2:
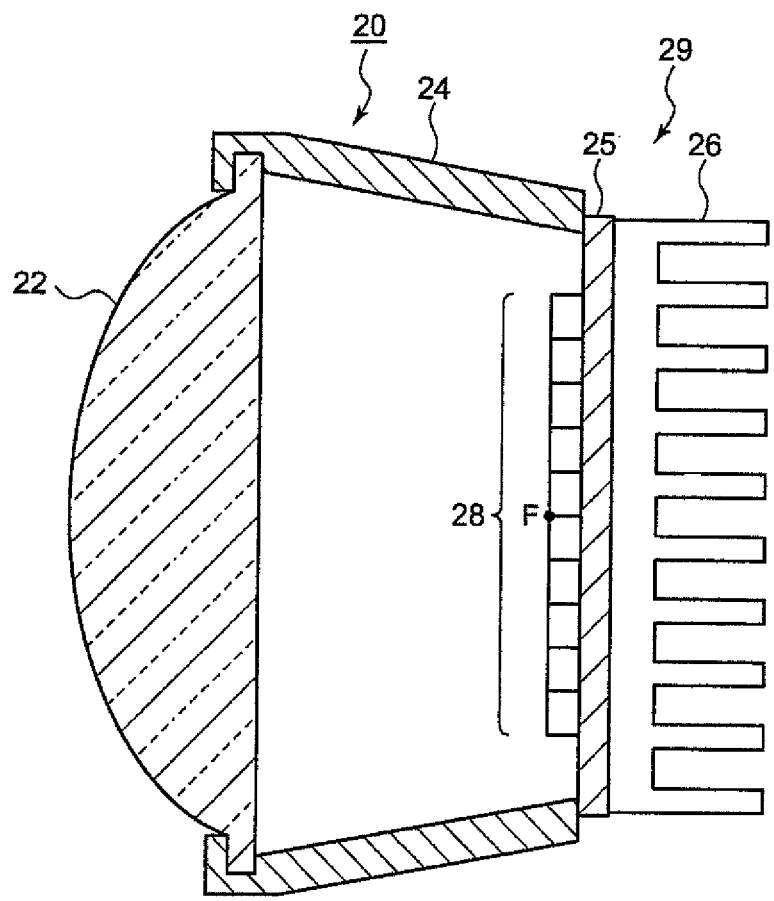
FIG. 2 is a diagram illustrating a first lamp unit of an LED array type.

FIG. 2 is a diagram illustrating the first lamp unit 20 of the LED array type. More specifically, FIG. 2 is a cross-sectional view taken along a horizontal plane including an optical axis, when seen from an upper side.

The first lamp unit 20 has a holder 24, a projection lens 22, and a light emitting device unit 29.

The projection lens 22 is a plan-convex aspherical lens having a convex front surface and a flat rear surface, and projects a light source image that is formed on a rear focal plane on a virtual vertical screen ahead of the lamp. The projection lens 22 is attached to an opening of a tubular holder 24.

The light emitting device unit 29 has a substrate 25, a light emitting device array 28 made of a plurality of semiconductor light emitting devices (e.g., LEDs), and a heat sink 26. Each light emitting device configuring the light emitting device array 28 is formed in a rectangular shape having the same height, and is disposed in a shape of a straight line to form a strap on a surface of the substrate 25. In the illustrated embodiment, each light emitting device has the same width, and is configured to be turned on individually. The light emitting device unit 29 is attached to the other opening of the holder 24.

The light emitting devices have a light emitting chip (not illustrated) and a thin film, respectively. The light emitting chip is made of, for example, a white light emitting diode having a rectangular light emitting surface of about 1 mm square. In this instance, the light emitting chip is not limited thereto, and may be a light source of different element type which performs planar light emission in almost spot shape, for example, a laser diode. The thin film is provided to cover a light emitting surface of the light emitting chip. A rear focal point F of the projection lens 22 is positioned at a surface center of the light emitting device array 28. The heat sink 26 is made of metal, such as aluminum, having a plurality of fins, and is attached to a rear surface of the substrate 25. Each light emitting device is configured to be individually turned on.

As each light emitting device configuring the light emitting device array 28 is turned on, each image is projected on the virtual vertical screen ahead of the lamp. The size and attaching position of the respective light emitting devices are adjusted such that the images of the respective light emitting devices have irradiation ranges into which a region above the horizontal cutoff line of the low beam light distribution pattern to be irradiated by the high-low switchable lamp units 60L, 60R is divided along the horizontal direction.

Figure 3:
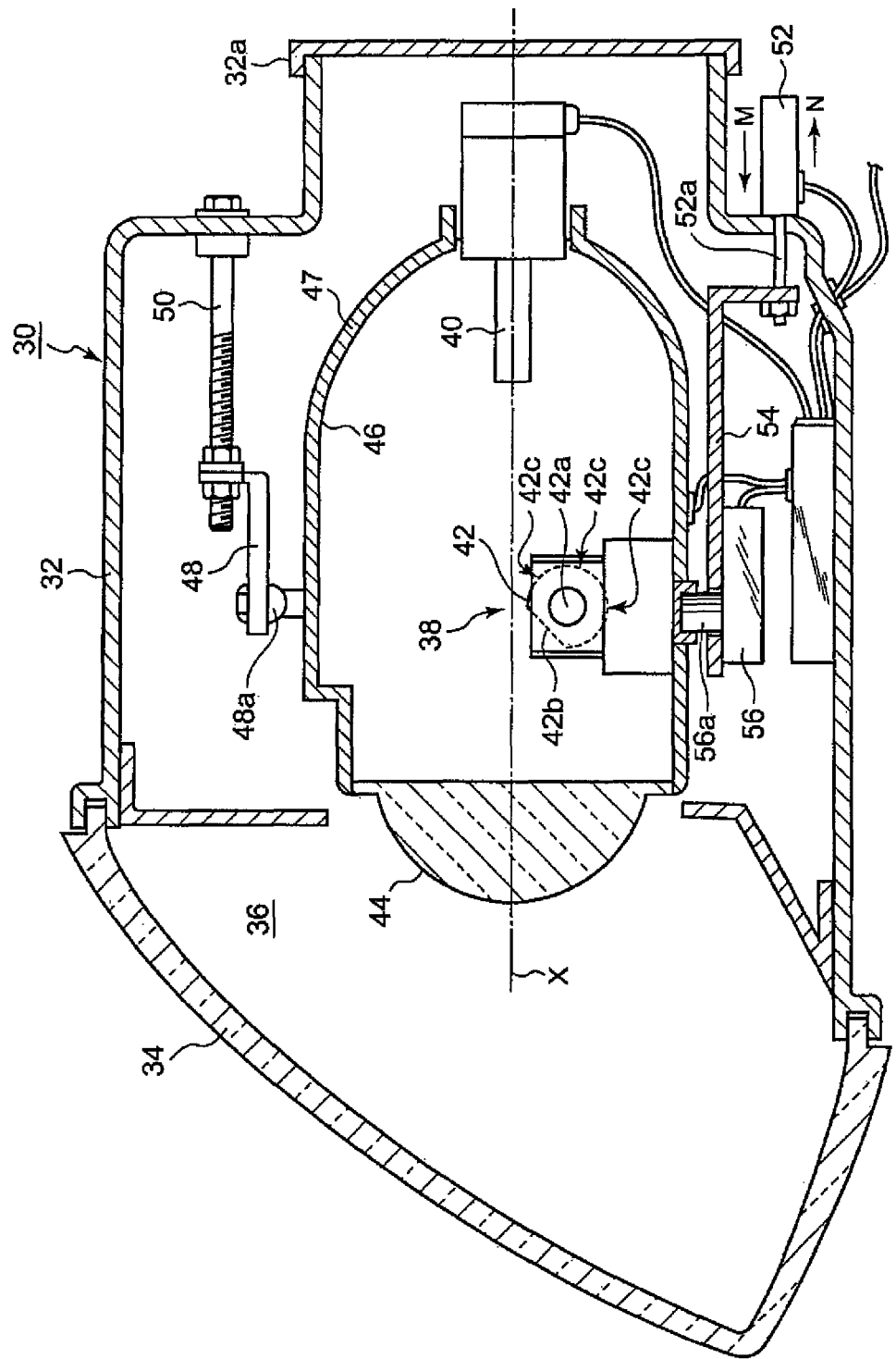
FIG. 3 is a diagram illustrating a second lamp unit of a mechanical switching type.

FIG. 3 is a diagram illustrating the configuration of the second lamp unit 30 of the mechanical switching type. FIG. 3 shows a cross-sectional view when the second lamp unit 30 is cut along a vertical plane extending in a front/rear direction of the vehicle and including an optical axis X.

The lamp unit 30 includes a lamp body 32 having an opening in the front direction of the vehicle, and a lamp chamber 36 formed by a transparent cover 34 to cover the opening of the lamp body 32. The lamp chamber 36 is provided therein with a lamp bracket 48 having a pivot mechanism 48a. The lamp bracket 48 is connected to a body bracket 50 vertically installed on an inner wall surface of the lamp body 32 by a screw or the like. Accordingly, a posture of the lamp unit can be changed such that the direction of the optical axis X is tilted forward or rearward on the basis of the pivot mechanism.

The unit bracket 54 is connected to a swivel actuator 56. The swivel actuator 56 is configured to achieve an adaptive front-lighting system (AFS) which can vary the light distribution for a curved road to irradiate a traveling direction, for example, when driving along the curved road. The swivel actuator 56 swivels the optical axis X of the lamp unit 30 around a pivot mechanism 56a in the traveling direction, based on for example a relative position of a forward vehicle.

The unit bracket 54 is connected to a leveling actuator 52 which is disposed outside the lamp body 32. The leveling actuator 52 includes, for example, an electric motor for extending or retracting a rod 52a in direction indicated by arrows M and N. If the rod 52a is extended in the direction indicated by the arrow M, the lamp unit is posed to tilt rearward around the pivot mechanism 48a, and thus the optical axis X points to the upward direction. Adversely, if the rod 52a is retracted in the direction indicated by the arrow N, the lamp unit is posed to tilt forward around the pivot mechanism 48a, and thus the optical axis X points to the downward direction.

Such leveling adjustment allows the optical axis to be adjusted in accordance with a vehicle attitude.

The lamp unit 30 includes a shade mechanism 38 having a rotary shade 42, a bulb (halogen lamp in FIG. 3) 40 serving as a light source, a housing 47 supporting a reflector 46 against the inner wall thereof, and a projection lens 44 in the lamp chamber 36. The reflector 46 reflects the light irradiated from the bulb 40. A portion of the light emitted from the bulb 40 and the light reflected from the reflector 46 is drawn toward the projection lens 44 via the rotary shade 42 configuring the shade mechanism 38.

The projection lens 44 is a plano-convex aspherical lens having a front surface which is a convex surface, and a rear surface which is a flat surface, and projects a light source image that is formed on the rear focal plane on a virtual vertical screen ahead of the lamp unit 30.

The rotary shade 42 is a substantially cylindrical member configured to be rotated around a rotating shaft 42a by an motor. A portion of the rotary shade 42 is provided with a cut portion 42b, and the remaining portion except for the cut portion 42b is formed to have a cylindrical surface so that a shape of a ridge section when is cut by a plane passing a center of a tube is continuously changed. Accordingly, by rotating the rotary shade 42 such that the cut portion 42b or a position 42c on the cylindrical surface of the rotary shade 42 is moved to the rear focal plane, the light distribution pattern that corresponds to the shape of the ridge section is formed on the virtual vertical screen (see FIG. 4C).

In this instance, a shade plate having a different ridge section every corresponding light distribution pattern may be disposed on the rotary shade. Further, the second lamp unit 30 may be configured to move the shade plate between an advance position and a retract position by using an actuator such as a motor or a solenoid, instead of the rotary shade.

Each of the high-low switchable lamp units 60L, 60R is configured to selectively form one of the high beam light distribution pattern and the low beam light distribution pattern. Such high-low switchable lamp units are well known in the art. Therefore, detailed description thereof will be omitted herein.

Figure 4C:
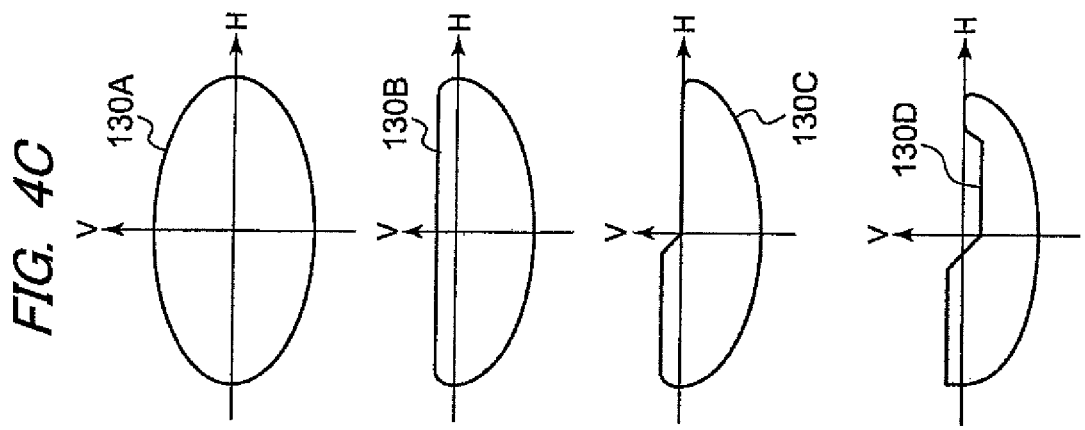
FIGS. 4A to 4C are diagrams illustrating light distribution patterns which can be irradiated by each lamp unit of the vehicle headlamp.
Figure 4B:
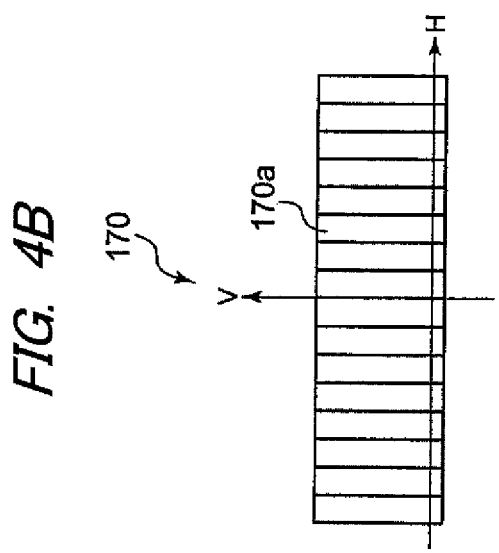
Figure 4A:
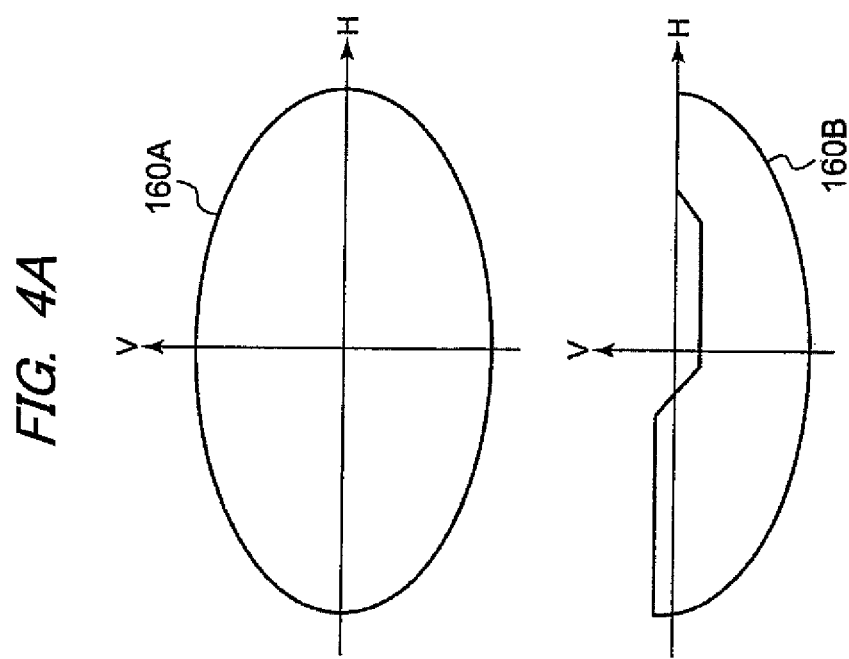

FIGS. 4A to 4C are diagrams illustrating the light distribution pattern which can be irradiated by each lamp unit configuring the vehicle headlamp 10.

FIG. 4A shows a high beam light distribution pattern 160A and a low beam light distribution pattern 160E which are formed by the high-low switchable lamp units 60L, 60R.

FIG. 4B shows an irradiation range 170 to be irradiated by the first lamp unit 20 of the LED array type. The irradiation range 170 includes a region above the horizontal line H. The irradiation range 170 is equally divided along the horizontal direction into a plurality of individual irradiation regions 170a in a stripe pattern. Each of the individual irradiation regions 170a corresponds to one of the light emitting devices of the light emitting device array 28.

FIG. 4C shows light distribution patterns 130A to 130D formed by the second lamp unit 30 of the mechanical switching type. The light distribution pattern 130A corresponds to a ridge shape of a shade cross section in the cut portion 42b of the rotary shade 42, and the light distribution patterns 130B to 130D correspond to ridge shapes of the cross section at a position 42C above the rotary shade 42 illustrated in FIG. 3. As described above, since the tubular surface of the rotary shade is configured so that its shape continuously changed, the second lamp unit 30 can continuously change the position of the horizontal cutoff line of the light distribution pattern in a vertical direction. Accordingly, the second lamp unit 30 has a higher resolution with respect to the irradiation range than the first lamp unit 20 which can change the irradiation range only in the unit of the individual irradiation region 170a.

Figure 5:
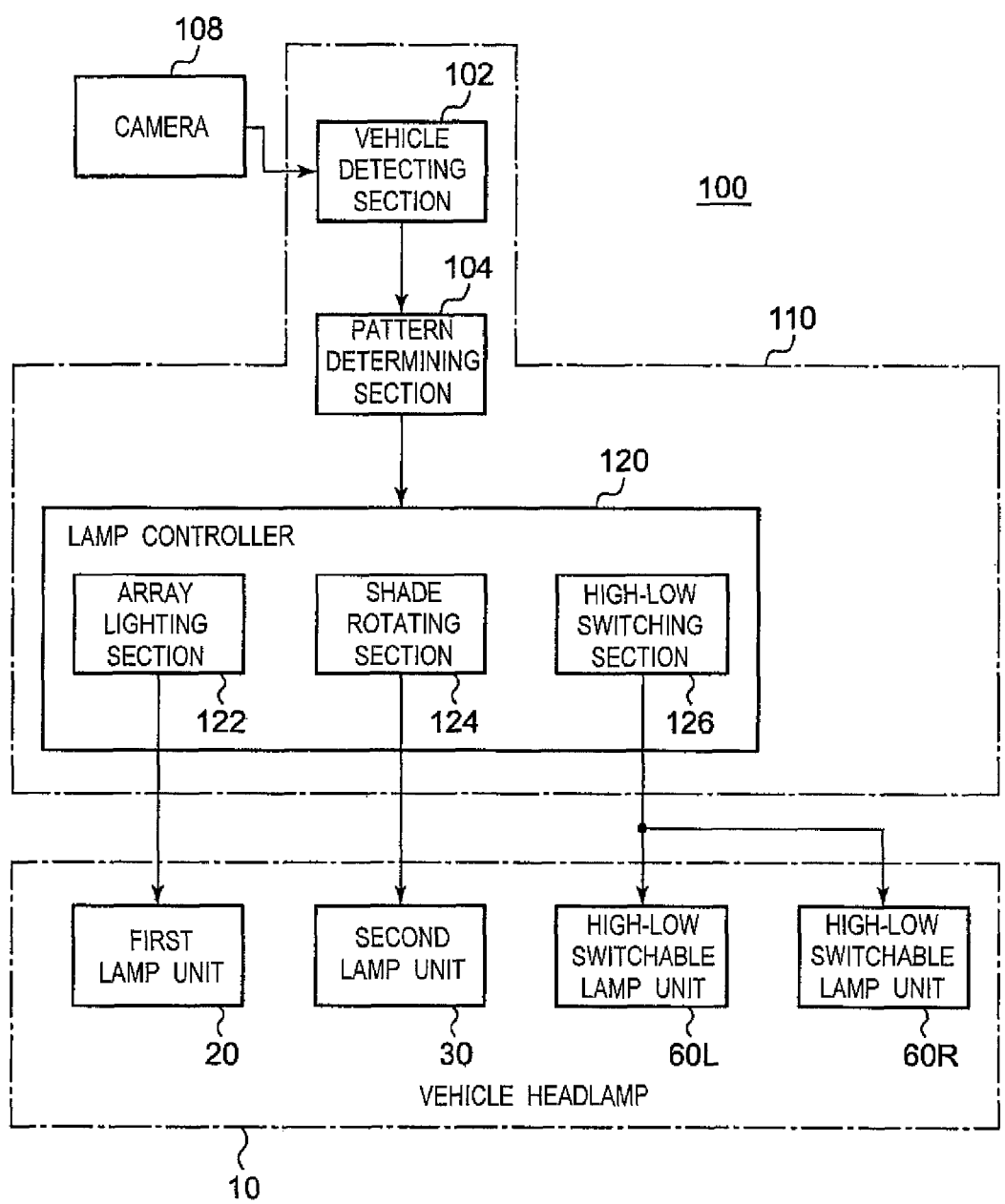
FIG. 5 is a block diagram of a vehicle headlamp system including the vehicle headlamp and a control unit for determining a light distribution pattern to be formed by the vehicle headlamp.

FIG. 5 is a block diagram of a vehicle headlamp system 100 including the vehicle headlamp 10 having the configuration described above, and a control unit 110 configured to determine the light distribution pattern to be formed by the vehicle headlamp 10.

In FIG. 5, each block shown in the control device 110 can be realized by a computer program or the like which is loaded in a memory as software, but is herein illustrated as a function block which can be realized by cooperation of the blocks. Accordingly, it would be understood by those skilled in the art that these blocks can be realized in various forms by the combination of the software.

A vehicle detecting section 102 performs a desired image process, such as an object recognition process, on an image frame taken by a camera 108, such as a stereo camera, to detect vehicles or pedestrians in front of own vehicle, or to detect a curvature of a road on which the vehicle is running.

A pattern determining section 104 determines an optimum light distribution pattern based on the position of the detected vehicle or pedestrian, or the curvature of the road, which is detected by the vehicle detecting section 102, and instructs a lamp controller 120 to form the light distribution pattern. For example, if a preceding vehicle or an oncoming vehicle is detected in a forward region, the pattern determining section 104 determines that a glare should be prevented, and instructs a founation of the low beam light distribution pattern or split light distribution pattern. Further, if no forward vehicle is detected, the pattern determining section 104 determines that the visibility of the driver should be improved, and instructs a formation of the high beam light distribution pattern. This kind of control system is called an adaptive driving beam (ADB) system.

The lamp controller 120 performs the control of turning on/off each lamp unit and the control of forming the light distribution pattern according to the instruction from the pattern determining section 104. The lamp controller 120 includes an array lighting section 122, a shade rotating section 124, and a high-low switching section 126.

The array lighting section 122 individually turns on/off the plurality of light emitting devices configuring the light emitting device array 28 in the first lamp unit 20 of the LED array type according to the instructed light distribution pattern.

The shade rotating section 124 controls the motor such that a position 42c on the cylindrical surface or the cut portion 42b of the rotary shade 42 of the second lamp unit 30 moves to a given position in accordance with the instructed light distribution pattern.

The high-low switching section 126 irradiates the high beam or the low beam onto the high-low switchable lamp units 60L, 60R according to the instructed light distribution pattern.

The vehicle headlamp system 100 can form an optimum combined light distribution pattern by overlapping the light distribution patterns formed by the respective lamp units under various circumstances in which own vehicle drives. Examples of the combined light distribution pattern will be described with reference to FIGS. 6A to 9D, each illustrating a light distribution pattern formed on the virtual vertical screen disposed 25m ahead of the vehicle headlamp 10.

FIGS. 6A to 6D are diagrams illustrating an example of the combined light distribution pattern formed by a combination of the second lamp unit 30 of the mechanical switching type and the high-low switchable lamp units 60L, 60R.

Figure 6A:
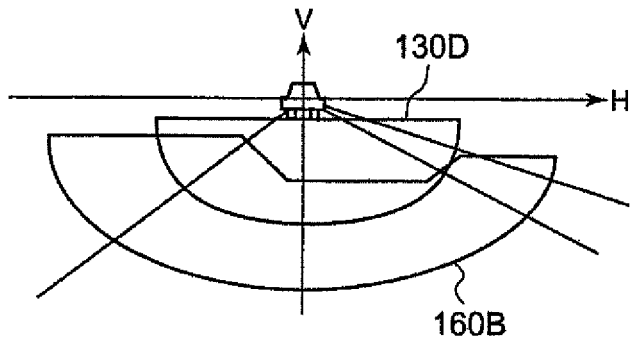
FIGS. 6A to 6D are diagrams illustrating examples of a combined light distribution pattern formed by a combination of the second lamp unit and a high-low switchable lamp unit.

FIG. 6A shows the combined light distribution pattern mixed with the low beam light distribution pattern 160B formed by the high-low switchable lamp units 60L, 60R and the light distribution pattern 130D formed by the second lamp unit 30. The combined light distribution pattern corresponds to the low beam light distribution pattern of which the horizontal cutoff line is moved downward to irradiate, for example, a region below and near the forward vehicle when driving uphill on a sloping road.

Figure 6B:
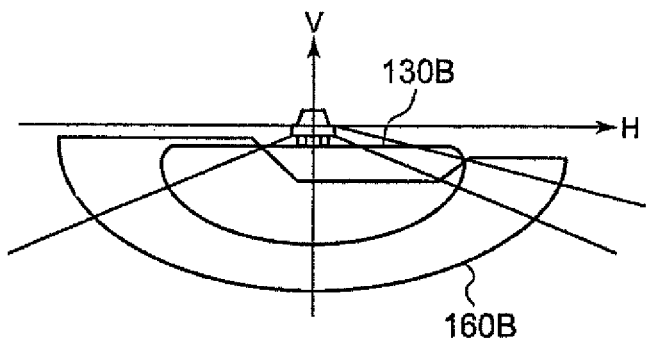

FIG. 6B shows the combined light distribution pattern mixed with the low beam light distribution pattern 160B formed by the high-low switchable lamp units 60L, 60R and the light distribution pattern 130E formed by the second lamp unit 30. The combined light distribution pattern corresponds to the low beam light distribution pattern of which the horizontal cutoff line is moved upward, as compared with the combined light distribution pattern in FIG. 6A.

Figure 6C:
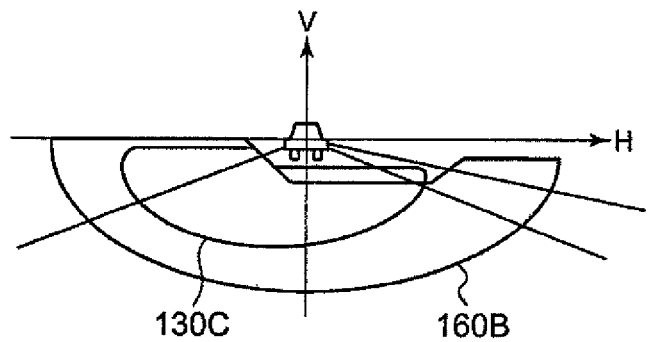

FIG. 6C shows the combined light distribution pattern mixed with the low beam light distribution pattern 160B formed by the high-low switchable lamp units 60L, 60R and the light distribution pattern 130C formed by the second lamp unit 30. The pattern corresponds to a so-called motorway mode of suppressing reflection on the road.

Figure 6D:
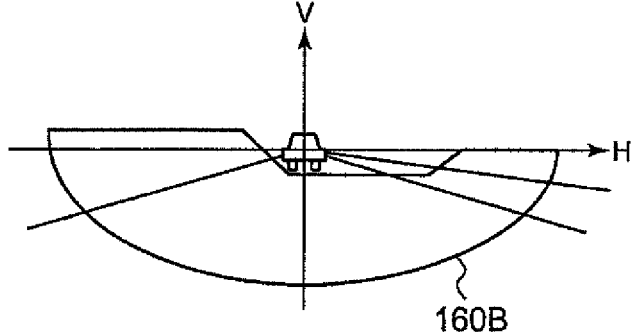

FIG. 6D shows only the low beam light distribution pattern 160B formed by the high-low switchable lamp units 60L, 60R.

FIGS. 7A to 7D are diagrams illustrating an example of a combined light distribution pattern formed by a combination of the first lamp unit 20 of the LED array type, the second lamp unit of the mechanical switching type and the high-low switchable lamp units 60L, 60R. In this instance, in FIGS. 7A to 7D, only the hatched range in the illumination region of the first lamp unit 20 is turned on.

Figure 7A:
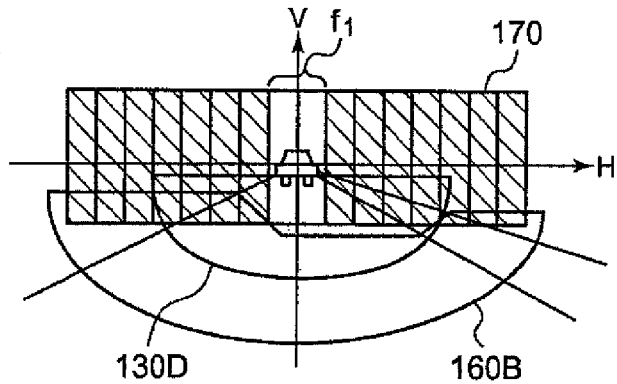
FIGS. 7A to 7D are diagrams illustrating examples of a combined light distribution pattern formed by a combination of the first lamp unit, the second lamp unit and the high-low switchable lamp unit.

FIG. 7A shows the combined light distribution pattern in which the low beam light distribution pattern 160B formed by the high-low switchable lamp units 60L, 60R and the light distribution pattern 130D formed by the second lamp unit 30 are combined, and only the individual irradiation region f1 of the irradiation range 170 of the first lamp unit 20 is turned off. The combined light distribution pattern corresponds to a split light distribution pattern which irradiates, for example, the vicinity of both sides of the forward vehicle, and in which the horizontal cutoff line is moved upward to irradiate a region below and near the forward vehicle, when driving uphill on a sloping road.

Figure 7B:
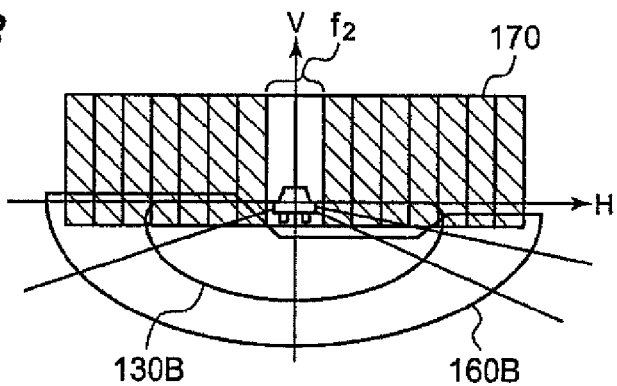

FIG. 7B shows the combined light distribution pattern in which the low beam light distribution pattern 160B formed by the high-low switchable lamp units 60L, 60R and the light distribution pattern 130B formed by the second lamp unit 30 are combined, and only the individual irradiation region f2 of the irradiation range 170 of the first lamp unit 20 is turned off. The combined light distribution pattern corresponds to a split light distribution pattern which irradiates, for example, the vicinity of both sides of the forward vehicle, and in which the horizontal cutoff line is moved downward, as compared with the light distribution pattern in FIG. 6A.

Figure 7C:
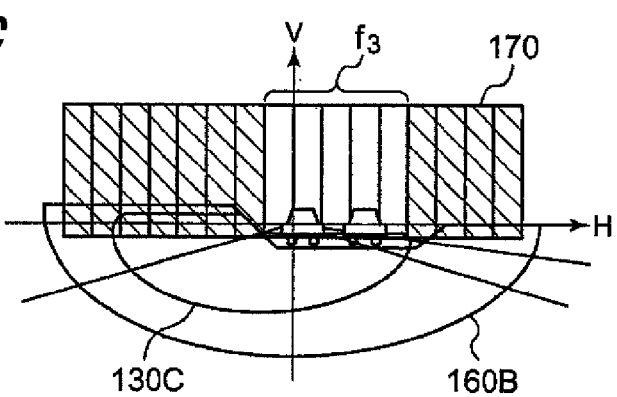

FIG. 7C shows the combined light distribution pattern in which the low beam light distribution pattern 160B formed by the high-low switchable lamp units 60L, 60R and the light distribution pattern 130C formed by the second lamp unit 30 are combined, and only the individual irradiation region f3 of the irradiation range 170 of the first lamp unit 20 is turned off. The combined light distribution pattern corresponds to a split light distribution pattern formed so as not to give glare to drivers of the preceding vehicle and the oncoming vehicle that are detected.

Figure 7D:
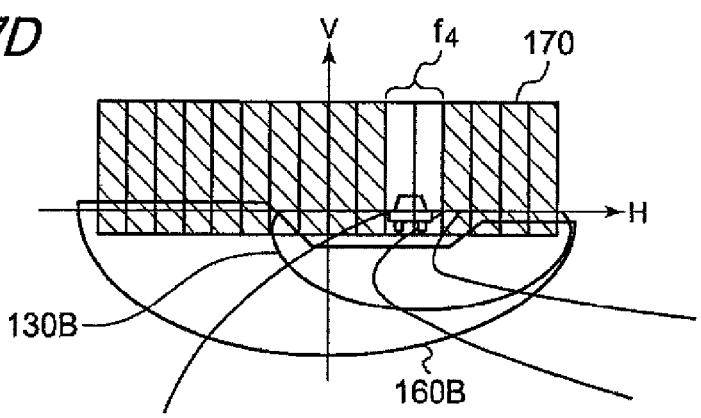

FIG. 7D shows the combined light distribution pattern in which the low beam light distribution pattern 160B formed by the high-low switchable lamp units 60L, 60R and the light distribution pattern 130B formed by the second lamp unit 30 are combined, and only the individual irradiation region f4 of the irradiation range 170 of the first lamp unit 20 is turned off. In the example, the second lamp unit 30 is swiveled by the above-mentioned swivel actuator, so that the light distribution pattern 130B is moved in a right direction in correspondence to the shape of the road. The combined light distribution pattern corresponds to a split light distribution pattern formed so as not to give glare to the driver of the forward vehicle with glare when driving on a curved road.

Figure 8A:
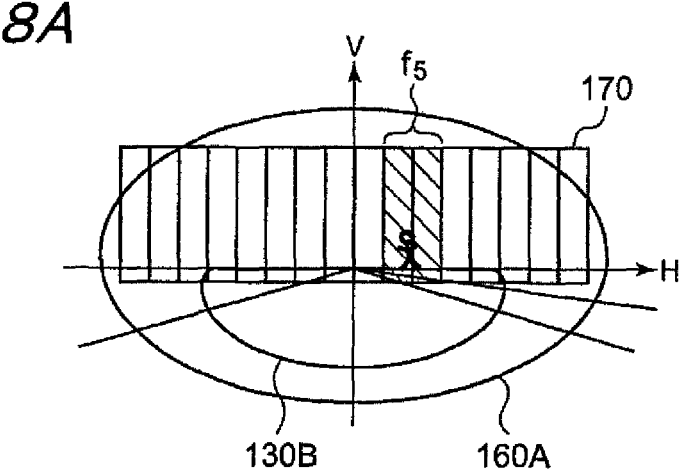
FIGS. 8A and 8B are diagrams illustrating examples of a combined light distribution pattern formed by a combination of the first lamp unit, the second lamp unit and the high-low switchable lamp unit to irradiate a region around a pedestrian.
Figure 8B:
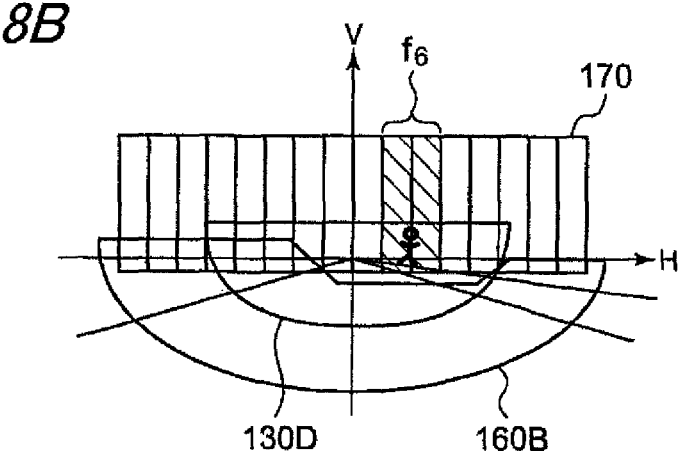

FIGS. 8A and 8B are diagrams illustrating an example of a combined light distribution pattern formed by a combination of the first lamp unit 20 of the LED array type, the second lamp unit 30 of the mechanical switching type, and the high-low switchable lamp units 60L, 60R to irradiate surroundings of a pedestrian. In this instance, in FIGS. 8A and 8B, only the hatched range in the illumination region of the first lamp unit 20 is turned on.

FIG. 8 shows the combined light distribution pattern in which the high beam light distribution pattern 160A formed by the high-low switchable lamp units 60L, 60R and the light distribution pattern 130B formed by the second lamp unit 30 are combined, and only the individual irradiation region f5 of the irradiation range 170 of the first lamp unit 20 is turned on. The combined light distribution pattern is a pattern to allow the driver of own vehicle to know the existence of the pedestrian by more brightly illuminating the surroundings of the pedestrian while the high beam is irradiated.

FIG. 8B shows the combined light distribution pattern in which the low beam light distribution pattern 160B formed by the high-low switchable lamp units 60L, 60R and the light distribution pattern 130D formed by the second lamp unit 30 are combined, and only the individual irradiation region f6 of the irradiation range 170 of the first lamp unit 20 is turned on. The combined light distribution pattern is a pattern to allow the driver of own vehicle to know the existence of the pedestrian by more brightly illuminating the surroundings of the pedestrian, and simultaneously, more brightly illuminating the vicinity of the cutoff line, while the low beam is irradiated.

FIGS. 9A to 9D are diagrams illustrating an example of a combined high beam light distribution pattern formed by a combination of the first lamp unit 20 of the LED array type, the second lamp unit 30 of the mechanical switching type, and the high-low switchable lamp units 60L, 60R. In FIGS. 9A to 9D, all the individual irradiation regions of the first lamp unit 20 is turned on.

Figure 9A:
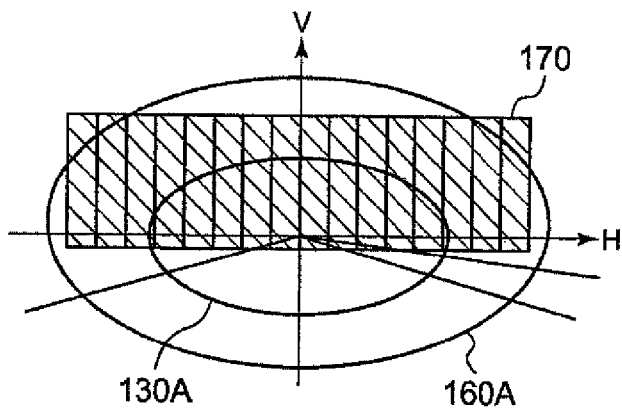
FIGS. 9A to 9D are diagrams illustrating examples of a combined high beam light distribution pattern formed by a combination of the first lamp unit, the second lamp unit and the high-low switchable lamp unit.

FIG. 9A shows the combined light distribution pattern in which the high beam, light distribution pattern 160A formed by the high-low switchable lamp units 60L, 60R, the light distribution pattern 130A formed by the second lamp unit 30, and the irradiation range 170 of the first lamp unit 20 are wholly combined.

Figure 9B:
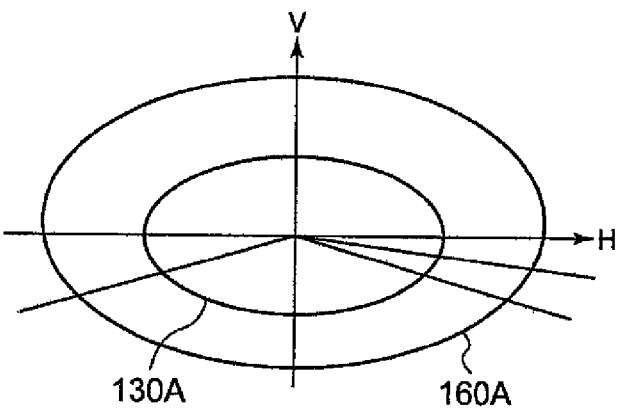

FIG. 9B shows the combined light distribution pattern in which the high beam light distribution pattern 160A formed by the high-low switchable lamp units 60L, 60R and the light distribution pattern 130A formed by the second lamp unit 30 are combined.

Figure 9C:
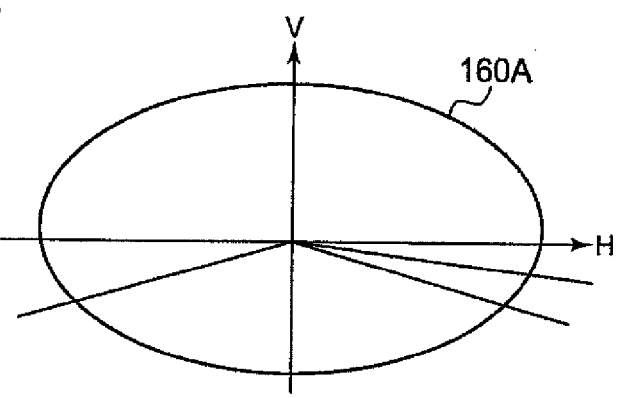

FIG. 9C shows only the high beam light distribution pattern 160A formed by the high-low switchable lamp units 60L, 60R.

Figure 9D:
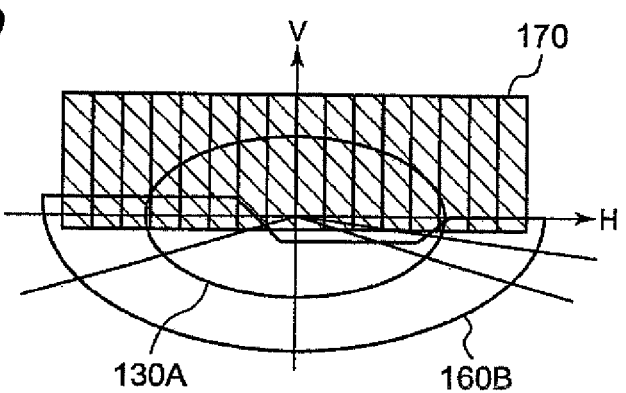

FIG. 9D shows the combined light distribution pattern in which the low beam light distribution pattern 160B formed by the high-low switchable lamp units 60L, 60R, the light distribution pattern 130A formed by the second lamp unit 30, and the illustration range 170 of the first lamp unit 20 are combined.

The combined light distribution patterns illustrated in FIGS. 9A to 9D are all high beam light distribution patterns. However, as shown in FIGS. 9A to 9D, high beam light distribution patterns having different illuminance can be provided by combining the light distribution patterns formed by three types of lamp units. For example, the illuminance of the high beam light distribution pattern shown in FIG. 9A is higher than the illuminance of the high beam light distribution patterns shown in FIGS. 9B to 9D, the illuminance of the high beam light distribution pattern shown in FIG. 9B is about the same as the illuminance of the high beam light distribution pattern shown in FIG. 9D, and the illuminance of the high beam light distribution pattern shown in FIG. 9C is the lowest.

As described above, according to one or more embodiments, by combining the lamp unit of the LED array type capable of finely adjusting the irradiation range in the horizontal direction with the lamp unit of the mechanical switching type having the high degree of freedom of the horizontal cutoff line in the vertical direction as compared with the LED array type, a variation of light distribution pattern which is able to be adjusted to various driving environments can be increased.

The vehicle headlamp including the above combination can be manufactured inexpensively as compared with the related art vehicle headlamp having the light emitting device array of the lattice type, and can improve the distant visibility since the horizontal cutoff line can be formed closer to the forward vehicle as compared with the LED array type. Further, light distribution unevenness between the individual irradiation regions, which may be observed in a stripe manner with the LED array type, does not occur in the horizontal direction.

In addition, the first lamp unit of the LED array type and the second lamp unit of the mechanical switching type are respectively disposed at only any one of the right lamp and the left lamp, but in most situations, both the lamp units are turned on. That is, it is rare that only one of the lamp units are turned on, which may cause the front view of the headlamp look suspicious.

Furthermore, in the vehicle headlamp 10, in the case where both the first lamp unit and the second lamp unit are turned off, the remaining high-low switchable lamp units 60L, 60R can still form the high beam light distribution pattern and the low beam light distribution pattern. Thus, it is not necessary to consider a fail-safe for a situation where the first lamp unit or the second lamp unit becomes inoperable.

Figure 10:
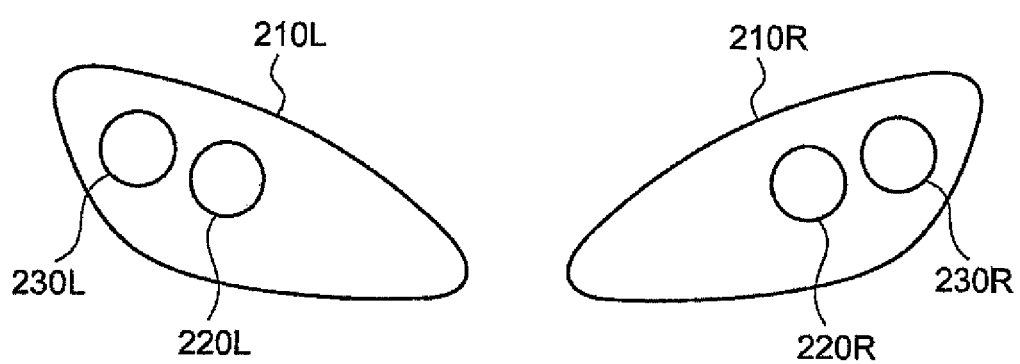
FIG. 10 is a front view of a vehicle headlamp according to one or more embodiments of the present invention.

FIG. 10 is a front view schematically illustrating a vehicle headlamp 210 according to another embodiment of the present invention. The vehicle headlamp 210 includes a left lamp 210L and a right lamp 210R which are disposed at a front portion of a vehicle body. The left lamp 210L has a first lamp unit 220L of an LED array type and a second lamp unit 230L of a mechanical switching type. The right lamp 210R has a second lamp unit 220R of an LED array type and a second lamp unit 230R of a mechanical switching type. In this way, the left lamp 210L and the right lamp 210R are provided with the same lamp unit in this embodiment, unlike the foregoing embodiment.

Since the internal structures of the first lamp units 220L, 220R of the LED array type and the second lamp units 230L, 230R of the mechanical switching type are substantially the same as or similar to those of the foregoing embodiment, its description will be omitted herein. The light distribution patterns formed by the respective lamp units 220L, 220R, 230L, 230R of the vehicle headlamp 210 are however different, as will be described below with reference to FIGS. 11A to 11F.

Figure 11B:
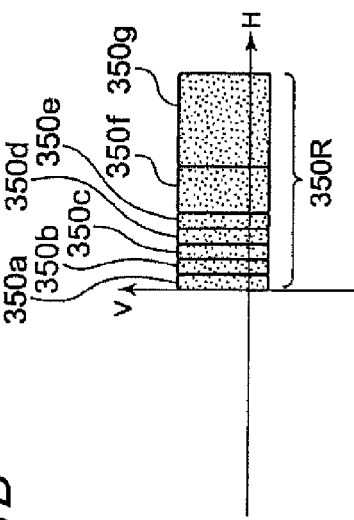
FIGS. 11A to 11F are diagrams illustrating light distribution patterns which can be irradiated by each lamp unit configuring the vehicle headlamp of FIG. 10.
Figure 11E:
Figure 11F:
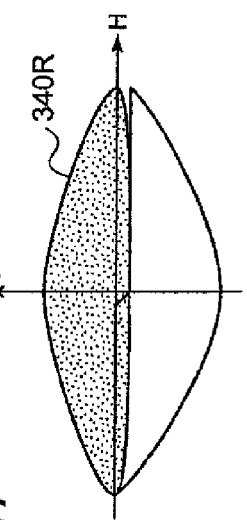
Figure 11A:
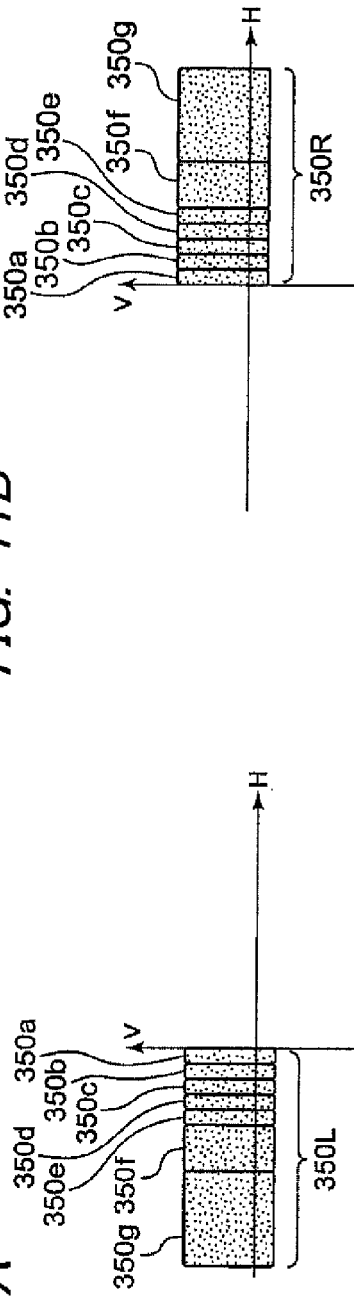

FIGS. 11A and 11B respectively show irradiation ranges 350L, 350R formed by the first lamp units 220L, 220R of the LED array type which irradiate the area including the upper portion from the horizontal line H. The irradiation ranges 350L, 350R consist of a plurality of individual strip-shaped illumination regions 350a to 350g which are divided in the horizontal direction. One individual irradiation region corresponds to one light emitting device on the light emitting device array 28. The respective light emitting devices can be turned on or turned off.

As illustrated, the irradiation ranges 350L formed by the first lamp unit 220L disposed at the left side of the vehicle body and the irradiation range 350R formed by the first lamp unit 220R disposed at the right side of the vehicle body are respectively positioned at both sides of the virtual vertical screen, with a vertical line being interposed therebetween. Further, the individual irradiation regions 350a to 350g forming the respective irradiation ranges are set such that horizontal width of the illumination region is increased as it is located further outward from the vertical line V. That is, a width of each of the regions 350a to 350e<a width of the region 350f<a width of the region 350g.

The reason why the individual irradiation regions of the first lamp unit of the LED array type are configured as described above is as follows. Like the related art, in the case where the left lamp and the right lamp are respectively provided with the array of the light emitting devices to have the illumination region extending in the left and right direction, and the irradiation by the left and right lamps is overlapped, as the number of the divided arrays is increased, the width of the respective individual irradiation regions is decreased, so that the irradiation with high resolution is possible. By contrast, as the number of the divided arrays is increased, its cost is increased. Like this embodiment, if any one of the left and right sides with the vertical line V interposed therebetween is covered by light emitting device arrays of the left lamp and the right lamp, the number of divided light emitting device arrays is sufficiently down by half, thereby decreasing its cost.

Further, the individual irradiation region of the first lamp unit is set such that the width of the individual irradiation region is increased as it is located further outward from the vertical line V. That is, the first lamp unit is configured such that the individual irradiation regions of the light emitting devices includes a first individual irradiation region and a second individual irradiation region located further outward from the vertical line V than the first individual irradiation region, and the second individual irradiation region is larger than the first individual irradiation region. Enlarging the width at the outer region may not change the number of variations of the light distribution pattern, but may contribute to the reduction of the number of light emitting devices in the array, so that the cost can be reduced.

Figure 11C:
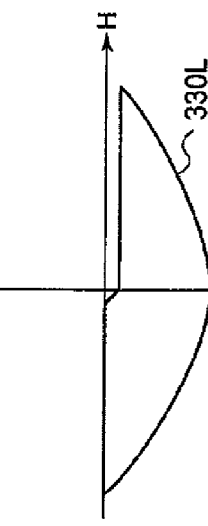
Figure 11D:
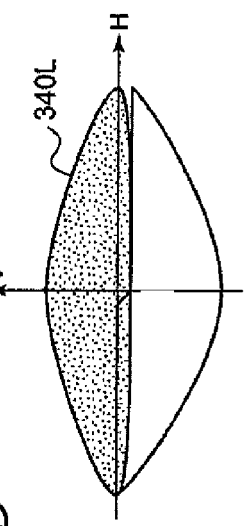

FIGS. 11C and 11D illustrate a low beam light distribution pattern 330L and a high beam light distribution pattern 340L formed by the second left lamp unit 230L. FIGS. 11E and 11F illustrate a low beam light distribution pattern 330R and a high beam light distribution pattern 340R formed by the second right lamp unit 230L. The second lamp units 230L, 230R are configured to switch the low beam light distribution pattern and the high beam light distribution pattern, for example, by driving of the rotary shade.

FIG. 12 is a block diagram of a vehicle headlamp system 200 including the vehicle headlamp 210 configured as described above, and a control unit 250 for determining the light distribution pattern in the vehicle headlamp 210. In FIG. 12, it would be understood by those skilled in the art that the respective function blocks can be realized in various forms by the combination of hardware and software.

A vehicle detecting section 202 performs a desired image process, such as an object recognition process, on an image frame taken by a camera 208, such as a stereo camera, to detect vehicles or pedestrians in front of own vehicle, or to detect a curvature of a road on which the vehicle is driving.

A pattern determining section 204 determines an optimum light distribution pattern based on the position of the detected vehicle or pedestrian, or the curvature of the road, which is detected by the vehicle detecting section 202, and instructs a lamp controller 220 to form the light distribution pattern. The pattern determining section 204 serves to determine one or more light emitting devices to be turned on, or one or more light emitting devices with which the illuminance of one ore more of the individual irradiation regions is to be increased, among the plurality of light emitting devices of the first lamp units 220L, 220R of the LED array type.

The lamp controller 220 performs the control of turning on/off each lamp unit and the control of forming the light distribution pattern according to the instruction from the pattern determining section 204. The array lighting section 242 individually turns on/off the plurality of light emitting devices contained in the first lamp units 220L, 220R of the LED array type according to the instructed light distribution pattern, and, as necessary, changes an applied voltage to increase the illuminance. A shade rotating section 244 controls the motor such that a position 42c on the cylindrical surface or the cut portion of the rotary shade of each of the second lamp units 230L, 230R moves to a given position in accordance with the instructed light distribution pattern.

The vehicle headlamp system 100 can form an optimum combined light distribution pattern by overlapping the light distribution patterns formed by the first lamp unit and the second lamp unit under various circumstances in which own vehicle drives. Examples of the combined light distribution pattern will be described with reference to FIGS. 13A to 13E, each illustrating a light distribution pattern formed on the virtual vertical screen disposed 25m ahead of the vehicle headlamp 210.

FIGS. 13A and 13B are diagrams illustrating the combined light distribution pattern in which the irradiation ranges 350L, 350R formed by the first lamp units 220L, 220R and the high beam light distribution patterns 340L, 340R formed by the second lamp units 230L, 230R are combined. The combined light illumination pattern corresponds to a case of performing a curved road following control, that is, a current of the light emitting device corresponding to the individual irradiation region toward which the road is curved is increased to improve the illuminance. FIG. 13A shows a case where the road is bent in a left direction, and the individual irradiation regions of the range f7 positioned at the left side than the vertical line V have the illuminance higher than that of the remaining individual irradiation regions. FIG. 13B shows a case where the road is bent in a right direction, and the individual irradiation regions of the range f8 positioned at the right side than the vertical line V have the illuminance higher than that of the remaining individual irradiation regions.

FIGS. 13A and 13B are diagrams illustrating the combined light distribution pattern in which the irradiation ranges 350L, 350R formed by the first lamp units 220L, 220R and the high beam light distribution patterns 340L, 340R formed by the second lamp units 230L, 230R are combined. In the combined light illumination pattern, only the individual irradiation region of the range f9 is turned on, and the remaining individual irradiation regions are turned off. This pattern corresponds to a spot irradiation light distribution pattern which irradiates the pedestrian in the range 19 to call the driver's attention of own vehicle.

FIG. 13D is a diagram illustrating the combined light distribution pattern in which the irradiation ranges 350L, 350R formed by the first lamp units 220L, 220R and the low beam light distribution patterns 330L, 330R formed by the second lamp units 230L, 230R are combined. In the combined light illumination pattern, only the individual irradiation region of the range f10 is turned on, and the remaining individual irradiation regions are turned off. This pattern corresponds to a spot irradiation light distribution pattern which irradiates the pedestrian in the range f10 to call the driver's attention of own vehicle.

FIG. 13E is a diagram illustrating the combined light distribution pattern in which the irradiation ranges 350L, 350R formed by the first lamp units 220L, 220R and the low beam light distribution patterns 330L, 330R formed by the second lamp units 230L, 230R are combined. In the combined light illumination pattern, only the individual irradiation regions of the ranges f11 to f14 are turned on, and the remaining individual irradiation regions are turned off. This pattern corresponds to the ADB light distribution pattern which irradiates both sides of the forward vehicle so as not to give glare to the driver of the forward vehicle in the ranges f12 and f13, and simultaneously, irradiates both sides of the road in the ranges f11 and 114. If the ADB is performed by the above method, the illuminance is lower than the case where the light emitting device arrays of the left and right lamps are overlapped, but the function of ADB can be sufficiently achieved.

As described above, according to one or more embodiments, the lamp unit of the mechanical switching type forming the common high beam is combined with one set of the lamp units of the LED array type at the left and right sides to irradiate only any one of the left and right sides along the vertical line. As compared with the configuration in which the lamp unit of the LED array type is installed at both left and right sides to be spread in the horizontal direction, since the number of the divided LED arrays is reduced by the above configuration, its cost can be decreased. The high beam can be formed only by the second lamp units of the mechanical switching type with sufficient illuminance required for the high beam.

Further, as the irradiations by the high beam and the light emitting devices are overlapped, various functions, such as the spot irradiation function or the curved road following function of the high beam, can be achieved.

While the invention has been described with respect to a limited number of embodiments, those skilled in the art, having benefit of this disclosure, will appreciate that other embodiments can be devised which do not depart from the scope of the invention as defined by the appended claims.

What is claimed is:

1. A vehicle headlamp comprising:
   a first lamp unit having a first irradiation range, the first lamp unit being configured such that the first irradiation range is adjustable in a horizontal direction above a horizontal cutoff line of a low beam light distribution pattern; and
   a second lamp unit having a second irradiation range, the second lamp unit being configured such that the second irradiation range is adjustable in a vertical direction,
   wherein a resolution of the second lamp unit with respect to the second irradiation range in the vertical direction is higher than a resolution of the first lamp unit with respect to the first irradiation range in the horizontal direction above the horizontal cutoff line.

2. The vehicle headlamp according to claim 1,
   wherein the first lamp unit comprises a plurality of light emitting devices configured such that each of the light emitting devices is individually turned on, the light emitting devices have individual irradiation regions into which a region above a horizontal cutoff line of the low beam light distribution pattern is divided along the horizontal direction.

3. The vehicle headlamp according to claim 2, further comprising
   a controller configured to individually turn the respective light emitting devices of the first lamp unit on and off.

4. The vehicle headlamp according to claim 3,
   wherein the second lamp unit comprises an actuator configured to change the height of the horizontal cutoff line, and
   wherein the controller is configured to drive of the actuator of the second lamp unit.

5. The vehicle headlamp according to claim 4,
   wherein the first lamp unit is configured to be disposed on one of a left side and a right side of a front portion of a vehicle body, and
   wherein the second lamp unit is configured to be disposed on the other of the left side and the right side of the front portion of the vehicle body, and
   wherein the second lamp unit further comprises a shade configured to form a plurality of light distribution patterns providing the horizontal cutoff line of the low beam light distribution pattern, a position of the horizontal cutoff line being adjustable in the vertical direction by a movement of the shade.

6. The vehicle headlamp according to claim 5,
   wherein, in accordance with a position of a forward vehicle, a position of a forward pedestrian, or a curvature of a road, the controller determines one or more of the light emitting devices of the first lamp unit to be turned on, and the position of the horizontal cutoff line of the low beam light distribution pattern to be formed by the second lamp unit.

7. The vehicle headlamp according to claim 3,
wherein the first lamp unit and the second lamp unit are configured to be disposed on each of a left side and a right side of a front portion of the vehicle body,
wherein the first irradiation range provided by the light emitting devices of the first lamp unit configured to be disposed on the right side of the vehicle body and the first irradiation range provided by the light emitting devices of the first lamp unit configured to be disposed on the left side of the vehicle body are located on respective sides of a vertical line on a virtual vertical screen, and
wherein the second lamp unit is configured to form the low beam light distribution pattern and a high beam light distribution pattern.

8. The vehicle headlamp according to claim 7,
wherein the first lamp unit is configured such that the individual irradiation regions of the light emitting devices includes a first individual irradiation region and a second individual irradiation region located further outward from the vertical line on the virtual vertical screen than the first individual irradiation region,
wherein the second individual irradiation region is larger than the first individual irradiation region.

9. The vehicle headlamp according to claim 8,
wherein, in accordance with a position of a forward vehicle, a position of a forward pedestrian, or a curvature of a road, the controller determines one or more of the light emitting devices to be turned on, or one or more of the light emitting devices with which an illuminance of one or more of the individual irradiation regions is to be increased.

10. A vehicle headlamp comprising:
a first lamp unit having a first irradiation range, the first lamp unit being configured such that the first irradiation range is adjustable in a horizontal direction; and
a second lamp unit having a second irradiation range, the second lamp unit being configured such that the second irradiation range is adjustable in a vertical direction,
wherein a resolution of the second lamp unit with respect to the second irradiation range is higher than a resolution of the first lamp unit with respect to the first irradiation range,
wherein the first lamp unit comprises a plurality of light emitting devices configured such that each of the light emitting devices is individually turned on, the light emitting devices have individual irradiation regions into which a region above a horizontal cutoff line of a low beam light distribution pattern is divided along the horizontal direction,
wherein the vehicle headlamp further comprises a controller configured to individually turn the respective light emitting devices of the first lamp unit on and off,
wherein the second lamp unit comprises an actuator configured to change the height of the horizontal cutoff line, and
wherein the controller is configured to drive of the actuator of the second lamp unit.

11. The vehicle headlamp according to claim 10,
wherein the first lamp unit is configured to be disposed on one of a left side and a right side of a front portion of a vehicle body, and
wherein the second lamp unit is configured to be disposed on the other of the left side and the right side of the front portion of the vehicle body, and
wherein the second lamp unit further comprises a shade configured to form a plurality of light distribution patterns providing the horizontal cutoff line of the low beam light distribution pattern, a position of the horizontal cutoff line being adjustable in the vertical direction by a movement of the shade.

12. The vehicle headlamp according to claim 11,
wherein, in accordance with a position of a forward vehicle, a position of a forward pedestrian, or a curvature of a road, the controller determines one or more of the light emitting devices of the first lamp unit to be turned on, and the position of the horizontal cutoff line of the low beam light distribution pattern to be formed by the second lamp unit.

13. A vehicle headlamp comprising:
a first lamp unit having a first irradiation range, the first lamp unit being configured such that the first irradiation range is adjustable in a horizontal direction above a horizontal cutoff line of a low beam light distribution pattern; and
a second lamp unit having a second irradiation range, the second lamp unit being configured such that the second irradiation range is adjustable in a vertical direction,
wherein a minimum adjustable amount of the second irradiation range of the second lamp unit in the vertical direction is smaller than a minimum adjustable amount of the first irradiation range of the first lamp unit in the horizontal direction above the horizontal cutoff line.

14. The vehicle headlamp according to claim 13,
wherein the first lamp unit comprises a plurality of light emitting devices configured such that each of the light emitting devices is individually turned on, the light emitting devices have individual irradiation regions into which a region above a horizontal cutoff line of the low beam light distribution pattern is divided along the horizontal direction.

15. The vehicle headlamp according to claim 14, further comprising
a controller configured to individually turn the respective light emitting devices of the first lamp unit on and off.

16. The vehicle headlamp according to claim 15,
wherein the second lamp unit comprises an actuator configured to change the height of the horizontal cutoff line, and
wherein the controller is configured to drive of the actuator of the second lamp unit.

* * * * *